(12) United States Patent
Mirabella et al.

(10) Patent No.: US 11,119,312 B2
(45) Date of Patent: Sep. 14, 2021

(54) ELECTRONIC DEVICE WITH OPTICAL SENSOR INTERFERENCE MITIGATION STRUCTURES

(71) Applicant: Apple Inc., Cupertino, CA (US)

(72) Inventors: Anna V. Mirabella, Palo Alto, CA (US); James R. Wilson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/379,000

(22) Filed: Apr. 9, 2019

(65) Prior Publication Data

US 2020/0064628 A1 Feb. 27, 2020

Related U.S. Application Data

(60) Provisional application No. 62/721,964, filed on Aug. 23, 2018.

(51) Int. Cl.
*G02B 27/28* (2006.01)
*G02B 27/00* (2006.01)
*G02B 27/02* (2006.01)
*G02B 27/01* (2006.01)

(52) U.S. Cl.
CPC ..... *G02B 27/0093* (2013.01); *G02B 27/0172* (2013.01); *G02B 27/0176* (2013.01); *G02B 27/028* (2013.01)

(58) Field of Classification Search
CPC ............ G02B 27/0093; G02B 27/0172; G02B 27/0176; G02B 27/028
See application file for complete search history.

(56) References Cited

U.S. PATENT DOCUMENTS

| 8,957,835 B2 | 2/2015 | Hoellwarth |
| 8,964,298 B2 | 2/2015 | Haddick et al. |
| 2007/0285392 A1* | 12/2007 | Lee ................. G06F 3/0317 |
| | | 345/166 |
| 2012/0062445 A1 | 3/2012 | Haddick et al. |
| 2012/0206452 A1 | 8/2012 | Geisner et al. |

(Continued)

FOREIGN PATENT DOCUMENTS

| CN | 101086692 A | 12/2007 |
| CN | 102906623 A | 1/2013 |
| CN | 108369340 A | 8/2018 |

*Primary Examiner* — Towfiq Elahi
(74) *Attorney, Agent, or Firm* — Treyz Law Group, P.C.; G. Victor Treyz; David K. Cole (57) ABSTRACT

An electronic device such as a head-mounted device may have a transparent member supported by head-mounted support structures. Optical sensors such as time-of-flight sensors and other optical sensors may have light-emitting components and light-detecting components. A stray light blocking structure may be formed in the transparent member. The stray light blocking structure may be configured to block stray light that is traveling laterally through an interior portion of the polymer layer. This prevents the stray light from being received by the light-detecting detecting device. The stray light blocking structure may formed by providing the polymer layer with light redirecting structures such as protrusions and/or recesses. Light-absorbing coatings and/or patterned surfaces such as textured surfaces may be incorporated into the stray light blocking structure.

21 Claims, 5 Drawing Sheets

(56) References Cited

U.S. PATENT DOCUMENTS

| | | | |
|---|---|---|---|
| 2012/0235884 A1 | 9/2012 | Miller et al. | |
| 2012/0243102 A1* | 9/2012 | Takeda | G02B 17/086 |
| | | | 359/630 |
| 2013/0278631 A1* | 10/2013 | Border | G06F 3/04842 |
| | | | 345/633 |
| 2016/0260261 A1 | 9/2016 | Hsu | |
| 2016/0282622 A1* | 9/2016 | Hiraide | G02B 6/00 |
| 2016/0370461 A1* | 12/2016 | Sugiura | G01S 17/42 |
| 2018/0067212 A1* | 3/2018 | Wilson | G06F 1/1684 |
| 2018/0364485 A1* | 12/2018 | Mallinson | G02B 27/0172 |

* cited by examiner

ELECTRONIC DEVICE WITH OPTICAL SENSOR INTERFERENCE MITIGATION STRUCTURES

This application claims the benefit of provisional patent application No. 62/721,964, filed Aug. 23, 2018, which is hereby incorporated by reference herein in its entirety.

FIELD

This relates generally to electronic devices, and, more particularly, to electronic devices with optical sensors.

BACKGROUND

Electronic devices may include optical sensors. Optical sensors sometimes include light-emitting and light-detecting components.

Challenges can arise in incorporating optical sensors into electronic devices. If care is not taken, stray light from a light-emitting device can create noise for a light-detecting device. This can adversely affect optical sensor accuracy.

SUMMARY

An electronic device such as a head-mounted device may have a transparent member supported by head-mounted support structures. The transparent member may cover the front of a head-mounted device and may overlap eye boxes where a user's eyes receive images from a display in the electronic device. Sensors may be used to make measurements of the environment surrounding a user of the head-mounted device. In some configurations, displayed images may be overlaid on top of real world images. Transparent members may also be incorporated into handheld devices and other equipment.

A transparent member for a head-mounted device or other equipment may be formed from a layer of polymer or other material. Optical sensors such as time-of-flight sensors and other optical sensors may have light-emitting components and light-detecting components. The optical sensors may be configured to operate through the transparent member. For example, a light-emitting component may emit light through transparent member and a light-detecting component may detect light that has passed through the transparent member. With an illustrative configuration, a first light-emitting device and first light-detecting device that form a first time-of-flight sensor may be located on a left side of a head-mounted device and a second light-emitting device and second light-detecting device that form a second time-of-flight sensor may be located on a right side of the transparent member. Other configurations for a head-mounted device that incorporates one or more light-emitting devices and one or more light-detecting devices may be used, if desired.

A stray light blocking structure may be formed from a protrusion and/or a recess in the transparent member. The stray light blocking structure may be configured to block stray light that is traveling laterally through an interior portion of the polymer layer. This prevents the stray light that has been emitted from a light-emitting device and coupled into the interior of the polymer layer from being received by a light-detecting detecting device. For example, an elongated strip-shaped stray light blocking structure that runs down the center of a polymer layer on the front of a head-mounted display may prevent stray light interference between the first and second time-of-flight sensors located respectively on opposing sides of the stray light blocking structure.

The stray light blocking structure may be formed by providing a polymer layer with light redirecting structures such as protrusions and/or recesses. Light-absorbing coatings and/or patterned surfaces such as textured surfaces may be incorporated into the stray light blocking structure.

DETAILED DESCRIPTION

An electronic device may have a transparent member such as a transparent cover layer of glass or polymer in a pair of goggles, glasses, or other head-mounted device. The transparent member may be formed from a layer of polymer, a glass layer, and/or other layers of material and may have stray light blocking structures that help block stray light propagation within the transparent layer. This helps reduce stray light interference between optical components mounted at different locations behind the transparent layer.

Figure 1:
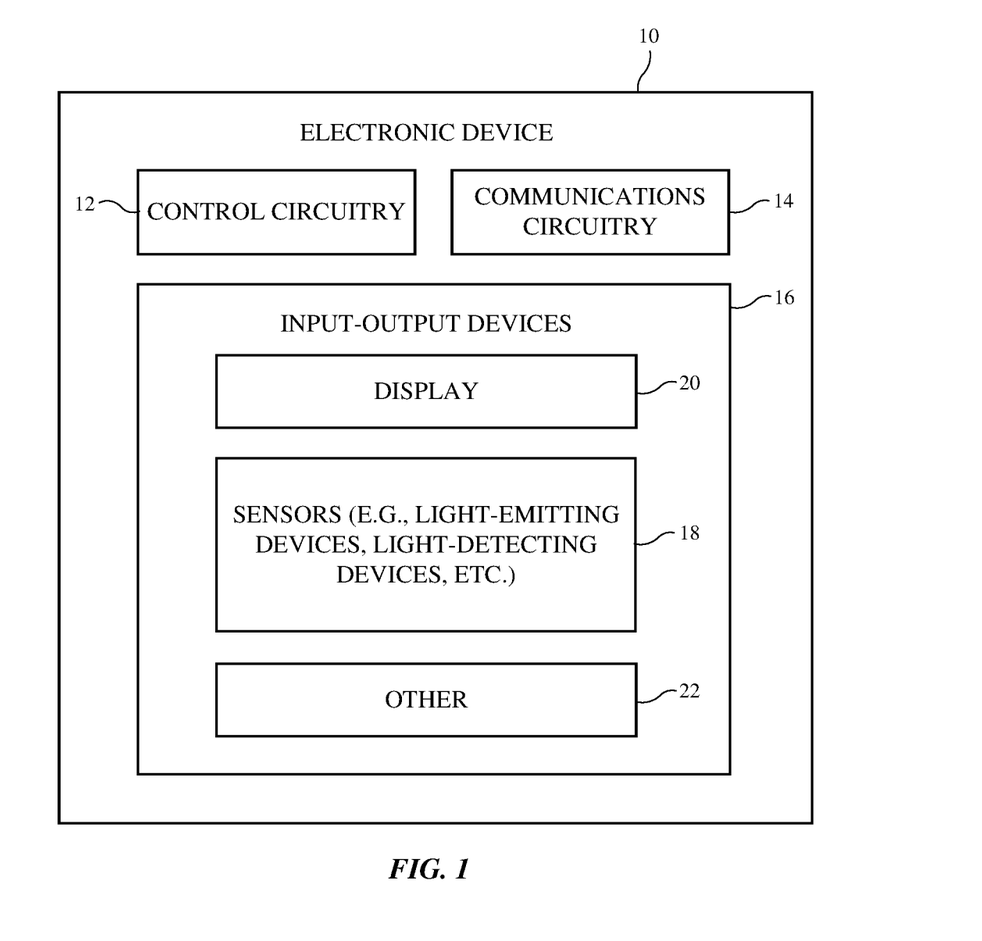
FIG. 1 is a schematic diagram of an illustrative electronic device in accordance with an embodiment.

An illustrative electronic device of the type that may include a transparent member with stray light blocking is shown in FIG. 1. As shown in FIG. 1, device 10 may include control circuitry 12, communications circuitry 14, and input-output devices 16. Device 10 may be a laptop computer, a computer monitor containing an embedded computer, a tablet computer, a desktop computer, a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a navigation device, an embedded system such as a system in which equipment is mounted in a kiosk, in an automobile, airplane, or other vehicle, a removable external case for electronic equipment, an accessory such as a remote control, computer mouse, track pad, wireless or wired keyboard, or other accessory, and/or equipment that implements the functionality of two or more of these devices.

Control circuitry 12 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between device 10 and external electronic equipment, control circuitry 12 may communicate using communications circuitry 14. Communications circuitry 14 may include antennas, radio-frequency transceiver circuitry, and other wireless communications circuitry and/or wired communications circuitry. Circuitry 14, which may sometimes be referred to as control circuitry and/or control and communications circuitry, may, for example, support wireless communications using wireless local area network links, near-field communications links, cellular telephone links, millimeter wave links, and/or other wireless communications paths.

Input-output devices 16 may be used in gathering user input, in gathering information on the environment surrounding the user, and/or in providing a user with output. Devices 16 may include sensors 18. Sensors 18 may include force sensors (e.g., strain gauges, capacitive force sensors, resistive force sensors, etc.), audio sensors such as microphones, capacitive touch sensors, capacitive proximity sensors, other touch sensors, ultrasonic sensors, sensors for detecting position, orientation, and/or motion (e.g., accelerometers, magnetic sensors such as compass sensors, gyroscopes, and/or inertial measurement units that contain some or all of these sensors), muscle activity sensors (EMG), radio-frequency sensors (e.g., radar and other ranging and positioning sensors), humidity sensors, moisture sensors, and/or other sensors.

Input-output devices 16 may include optical components such as light-emitting diodes (e.g., for camera flash or other blanket illumination, etc.), lasers such as vertical cavity surface emitting lasers and other laser diodes, laser components that emit multiple parallel laser beams (e.g., for three-dimensional sensing), lamps, and light sensing components such as photodetectors and digital image sensors. For example, sensors 18 in devices 16 may include depth sensors (e.g., structured light sensors and/or depth sensors based on stereo imaging devices that can optically sense three-dimensional shapes), optical sensors such as self-mixing sensors and light detection and ranging (lidar) sensors that gather time-of-flight measurements and/or other measurements to determine distance between the sensor and an external object and/or that can determine relative velocity, monochromatic and/or color ambient light sensors that can measure ambient light levels, proximity sensors based on light (e.g., optical proximity sensors that include light sources such as infrared light-emitting diodes and/or lasers and corresponding light detectors such as infrared photodetectors that can detect when external objects are within a predetermined distance), optical sensors such as visual odometry sensors that gather position and/or orientation information using images gathered with digital image sensors in cameras, gaze tracking sensors, visible light and/or infrared cameras having digital image sensors configured to gather image data, optical sensors for measuring ultraviolet light, and/or other optical sensor components (e.g., light sensitive devices and, if desired, light source), and/or other optical components (one or more light-emitting devices, one or more light-detecting devices, etc.).

Input-output devices 16 may also include displays such as display 20. Displays in device 10 may be organic light-emitting diode displays, displays based on arrays of light-emitting diodes formed from crystalline semiconductor dies, liquid crystal displays, electrophoretic displays, microelectromechanical systems (MEMs) displays such as displays with arrays of moving mirrors, liquid-crystal-on-silicon displays, and/or other displays.

If desired, input-output devices 16 may include other devices 22. Devices 22 may include components such as status indicator lights (e.g., light-emitting devices such as light-emitting diodes in devices 10 that serve as power indicators), and other light-based output devices, speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 22 may also include power transmitting and/or receiving circuits configured to transmit and/or receive wired and/or wireless power signals. Devices 22 may include buttons, rotating buttons, push buttons, joysticks, keys such as alphanumeric keys in a keyboard or keypad, microphones for gathering voice commands, touch sensor input devices, accelerometers for gathering user input gestures such as tap gestures, and/or other devices for gathering user input. Devices 22 may also include output components such as haptic output devices and other output components.

Figure 2:
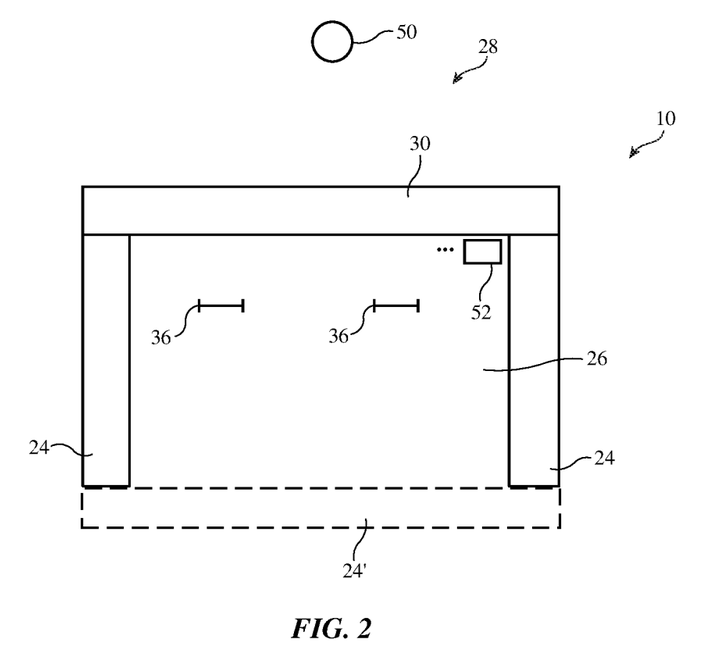
FIG. 2 is a top view of an illustrative electronic device in accordance with an embodiment.

In an illustrative arrangement, which may sometimes be described herein as an example, device 10 may be a head-mounted device. Consider, as an example, the arrangement of FIG. 2. As shown in FIG. 2, device 10 may have housing structures such as housing 24. Housing 24 may be formed from materials such as polymer, glass, metal, ceramic, fabric, wood, other materials, and/or combinations of these materials. Housing 24 may be used to support structures such as transparent member 30 that separate interior region (interior) 26 from exterior region (exterior) 28. In some configurations, housing 24 may have portions such as portion 24' that help enclose some or all of interior 26 and separate interior 26 from exterior 28 (e.g., when housing 24 forms portions of the body of a vehicle or forms an enclosure for a cellular telephone or computer. In these arrangements, printed circuits, integrated circuits, mechanical structures, and other components (see, e.g., control circuitry 12, communications circuitry 14 and/or input-output devices 16) may be located within the enclosure formed by housing 24. Components such as these may also be coupled to housing 24 via a cable (as an example). In some arrangements, components for device 10 may be embedded within hollow portions of housing 24.

If desired, housing 24 of FIG. 2 may be configured to form head-mounted support structures that hold device 10 on a head of a user (with or without a rear strap or other rear portion 24') and member 30 may form some or all of a front portion for device 10 that helps separate interior 26 from exterior 28. In virtual reality arrangements, device 10 may include lenses or other optical system components and a display such as display 20 to provide virtual content to a user (e.g., still and/or moving images such as computer-generated content, etc.). In augmented reality arrangements, a forward facing camera (e.g., a camera supported by housing 24 and/or member 30) may gather images of the real world such as real-world object 50 for presentation to the user with display 20 and/or the user may view real-world objects such as object 50 through transparent member 30. Waveguides with holographic couplers or other optical couplers may, as an example, overlap member 30 and/or may be incorporated into member 30 to merge computer-generated images from display 20 to eye boxes 36 with real-world image light (e.g., real-world image light from real-world objects such as external object 50).

To provide transparent member 30 with the ability to pass visible light (e.g., so that a user with eyes at eye boxes 36 can view real-world images through transparent member 30), member 30 can have bulk light transmission properties and, if desired, may have coatings (e.g., thin metal coatings and/or thin-film interference filter coatings formed from stacks of dielectric materials, and/or other coatings) that are configured to pass sufficient visible light for image viewing (e.g., at least 10% of ambient light may be transmitted, at least 50% of ambient light may be transmitted, etc.). In some configurations, member 30 (e.g., a substrate layer of transparent polymer or other material and/or one or more coatings of dielectric, metal, thin-film interference filter coatings, etc.) may be configured to block some or all infrared light (e.g., near infrared light) and/or to transmit some or all near infrared light or other infrared light (over the entire surface of member 30 and/or over a portion of member 30). In arrangements in which member 30 is transparent to infrared light, infrared optical components may operate through member 30.

One or more components such as component 52 may be mounted adjacent to the inner surface of member 30. Components 52 may be optical components (e.g., light-emitting devices and/or light-detecting devices). For example, components 52 may be time-of-flight light sensor components, image sensors, depth sensors, proximity sensors, and/or other optical sensors for determining the location (e.g., the distance) of objects such as external object 50 in the user's environment. Components 52 may also include other optical components that emit and/or detect light (e.g., a camera flash, an infrared light-emitting diode that emits blanket infrared light, image sensors, etc.).

During operation, one or more of components 52 may be used to emit light and/or one or more of components 52 may be used to detect light. For example, a first of components 52 at a first location on the interior surface of member 30 may emit light and a second of components 52 at a second location on the interior surface of member 30 may detect light. The second component may, as an example, detect some of the emitted light that has reflected (scattered) from external object 50 (e.g., during operation of a time-of-flight sensor formed from the first and second components and/or during other optical sensing operations).

Figure 3:
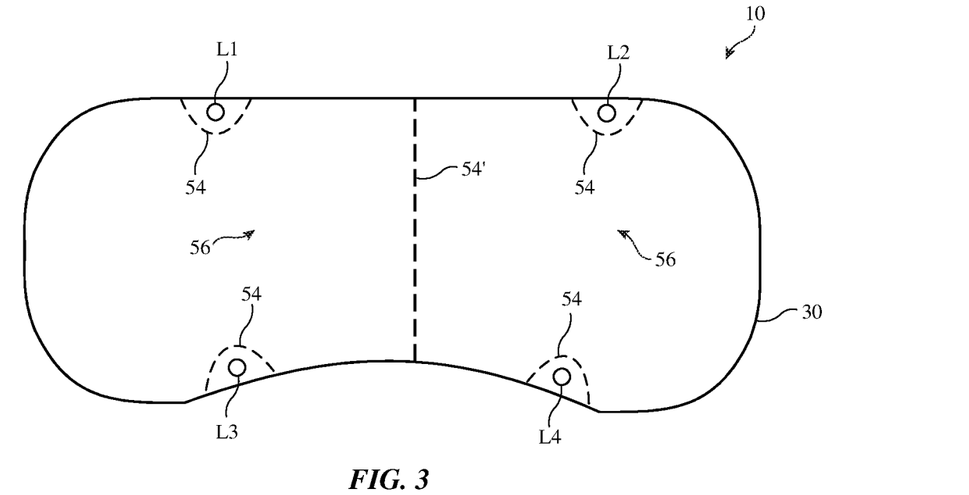
FIG. 3 is a front view of an illustrative electronic device in accordance with an embodiment.

FIG. 3 is a front view of member 30 in an illustrative configuration in which device 10 includes optical components such as component 52. The optical components may be formed in interior 26 or other suitable portion of device 10 and may be overlapped by member 30 at one or more locations such as illustrative locations L1, L2, L3, and L4. There may be any suitable number of components 52 in device 10 (e.g., at least one, at least two, at least three, at least four, at least 10, fewer than 25, fewer than 8, etc.). In the example of FIG. 3, there are two light-emitting components and two light-detecting components. Each light-emitting component and light-detecting component pair may form a corresponding time-of-flight sensor (as an example). The emitted light from the light-emitting components may be infrared light (as an example). The light-emitting components may be located at locations L1 and L2 while the light detecting components are located at locations L3 and L4 or other layouts may be used. In arrangements in which light-emitting components are located at locations L1 and L2 and light detecting components are located at locations L3 and L4, the light-emitting component at L1 and the light-detecting component at L3 may form a first time-of-flight sensor (as an example) and the light-emitting component at L2 and the light-detecting component at L4 may form a second time-of-flight sensor.

In arrangements such as these in which emitted light from a light-emitting component is being sensed by a light-detecting component, there is a potential for scattered light interference as the emitted light passes through member 30. For example, emitted light from a light-emitting component at location L1 may scatter from an optical defect in member 30 (e.g., a surface pit or bump or a light-scattering particle in the portion of member 30 that overlaps the light-emitting component) and this scattered light may propagate laterally within member 30 in accordance with the principle of total internal reflection (e.g., member 30 may serve as a waveguide). The scattered light from the light-emitting component at location L1 may, as an example, be detected by a light-detecting component at a location such as location L3 or L4 (as an example). Because the scattered light did not reflect off of an external object such as object 50, but rather was coupled to the light-detecting component internally within device 10, the scattered light serves as a source of noise.

To reduce interference between light-emitting components and light-detecting components that are configured to operate through member 30, member 30 may include one or more stray light blocking structures. As shown in FIG. 3, illustrative stray light blocking structures 54 may be placed at locations in member 30 that laterally surround some or all of a light-emitting component, that laterally surround some or all of a light-detecting component, and/or that otherwise intervene between a light-emitting component and a light-detecting component. When structures 54 are incorporated into member 30, stray light from a light-emitting device is blocked (e.g., redirected and/or absorbed) before interfering with the measurements made by a light-detecting component, thereby enhancing sensor performance.

In the example of FIG. 3, stray light blocking structure 54' has an elongated strip shape that runs vertically across the entire face of member 40 and is located in the center of member 30. This helps prevent stray light emitted on one side of member 30 and device 10 (e.g., the left side of FIG. 3) from interfering with light measurements made by a light-detecting component on another side of member 30 and device 10 (e.g., the right side of FIG. 3). Arrangements of this type may be advantageous in devices in which a first time-of-flight sensor is formed from an emitter and detector pair on a first side of structure 54 and a second time-of-flight sensor is formed from an additional emitter and detector pair on a second side of structure 54. By optically isolating the first and second time-of-flight sensors from each other, electrical interference mitigation techniques (e.g., synchronizing operation of the two time-of-flight sensors using a time-division multiplexing technique to help reduce interference between the two sensors) need not be used. Light blocking structures in member 30 also reduce stray light noise within a given time-of-flight sensor.

FIG. 3 also shows how stray light blocking structure 54' and the other illustrative stray light blocking structures 54 of FIG. 3 may be formed in portions of member 30 that leave central portions 56 free of the stray light blocking structures. This allows a user to view real world objects through regions 56 of member 30 without experiencing optical distortion or other potentially undesired optical effects. In general, stray light blocking structures can be located in any suitable areas of member 30. The locations of the stray light blocking structures of FIG. 3 are illustrative.

Figure 4:
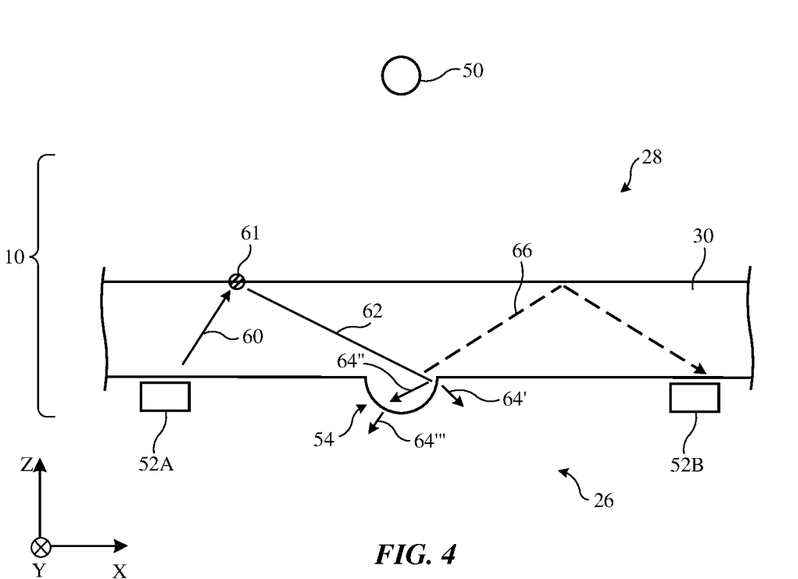
FIG. 4 is a cross-sectional view of a transparent layer in an electronic device in accordance with an embodiment.

FIG. 4 is a cross-sectional side view of member 30 in an illustrative configuration in which member 30 includes a stray light blocking structure. Member 30 may a transparent layer such as the transparent layer of polymer, glass, and/or other material on the front of a pair of glasses, goggles, or other head-mounted device or may be any other transparent layer for device 10. In the example of FIG. 4, stray light blocking structure 54 is a protrusion formed on the inner surface of member 30. Other stray light blocking structures may be used, if desired.

During operation of device 10 of FIG. 4, member 30 may allow light from light-emitting device 52A to pass from interior 26 to exterior 28 (e.g., to illuminate object 50) and may allow light (e.g., emitted light that has been reflected from object 50) to pass from exterior 28 to interior 26 and light-detecting device 52B.

Light-emitting device 52A emits light 60. Light 60 may be visible light, infrared light, or other light. For example, light 60 may be infrared light having a wavelength of 0.8 to 2.5 microns, from 1 micron to 2 microns, 1.5 microns, or other suitable wavelength. In the example of FIG. 4, there is a light-scattering structure (e.g. a surface pit or bump due to a scratch or other defect) such as light-scattering structure 61 that scatters some of emitted light 60 into the interior of member 30 as stray light 62. The index of refraction of layer 30 is greater than that of the air surrounding member 30. As a result, member 30 serves as a light guide layer (planar waveguide) that guides stray light 62 laterally (in the X-Y plane of FIG. 4) in accordance with the principle of total internal reflection.

Due to the presence of stray light blocking structure 54, a portion of stray light 62 is directed out of layer 30 at structure 54. For example, structure 54 may have surfaces that are not co-planar with the inner surface of member 30 and that are oriented so that the surface normal of these surfaces are close to parallel with rays of light 62. This locally defeats total internal reflection and allows light 62 to be coupled out of the interior of member 30 as indicated by ray 64'. This light is then scattered and absorbed within interior 26 and not detected as noise by light-detecting component 52B. Some rays of light 62 are coupled out of structure 54 in this way after reflecting from the non-coplanar surface of structure 54 (see, e.g., ray 64", which is reflected backward due to the curved surface associated with the rounded protrusion formed in structure 54 of FIG. 4, and associated ray 64''' which exits member 30 because ray 64''' is propagating nearly perpendicular to the surface normal of member 30 in structure 54).

The presence of stray light blocking structure 54 blocks a portion (e.g., at least 30%, at least 70%, at least 90%, or other suitable amount) of the stray light in member 30 that would otherwise propagate laterally within the interior of member 30 to light-detecting device 52B and create noise. As a result, any stray light that reaches light detecting component 52B (see, e.g., remaining stray light 66 in the example of FIG. 4) is significantly reduced. The signal-to-noise ratio of light-detecting component 52B (and therefore the signal-to-noise ratio of the time-of-flight sensor and/or other optical sensor formed from components 52A and 52B) may therefore be enhanced.

Stray light blocking structures such as illustrative structure 54 of FIG. 4 may include protrusions (e.g., ridges and/or bumps), recesses (e.g., pits or grooves), coatings (e.g., light-absorbing coatings, gratings, coatings that promote out-coupling of light by defeating total internal reflection), textured structures, and/or other structures that reduce the amount of emitted stray light that reaches light-defecting components such as component 52B of FIG. 4. These protrusions and other structures may be formed on the inner surface of member 30 and/or the outer surface of member 30. Configurations in which structure 54 is formed on the inner surface of member 30 may help hide structure 54 from view by people (external viewers) in the vicinity of device 10 and may provide device 10 with a clean external appearance.

Figure 5:
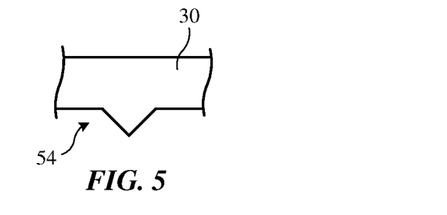
FIGS. 5, 6, 7, 8, 9 10, 11, 12, and 13 are cross-sectional side views of illustrative structures for a transparent layer in an electronic device to help reduce sensor interference from stray light in accordance with an embodiment.

FIG. 5 is a cross-sectional view of an illustrative stray light blocking structure formed from a protrusion in member 30 with a triangular cross-sectional profile.

Figure 6:
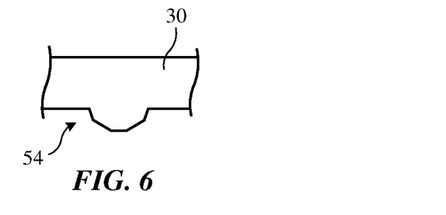

FIG. 6 shows stray light blocking structure 54 may have a cross-sectional profile with four (or more) straight segments.

Figure 7:
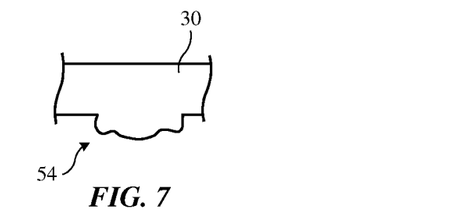

In the example of FIG. 7, stray light blocking structure 54 has a cross-sectional profile characterized by a central protrusion with smaller flanking protrusions.

Figure 8:
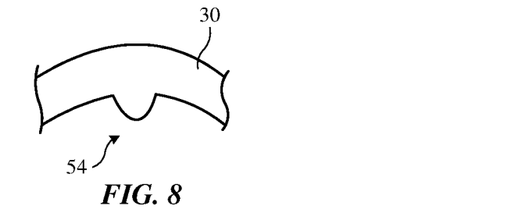

In the illustrative configuration of FIG. 8, member 30 has been formed from a transparent layer having a cross-sectional profile with curved surfaces. Stray light blocking structure 54 has been formed on a concave surface (e.g., a concave inner surface) of member 30. Illustrative stray light blocking structure 54 of FIG. 8 has a protrusion (e.g., a ridge) with a curved profile, but, in general, any suitable stray light blocking structure (recesses, texture, coatings, etc.) may be used on a transparent member with a curved shape.

Figure 9:
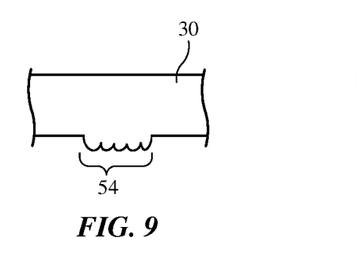

FIG. 9 shows how light blocking structure 54 may be formed from a series of protrusions such as ridges (and/or recesses or other structures configured to redirect light). The protrusions of FIG. 9 may be, for example, a series of parallel adjacent ridges with semicircular cross-sectional shapes or other profiles. There may be, for example, at least 2, at least 10, at least 40, at least 160, at least 600, at least 1200, less than 10,000, or other suitable number of adjacent parallel ridges in structure 54. Each ridge may have a width of at least 2 microns, at least 3 microns, at least 5 microns, at least 7 microns, less than 10 microns, less than 100 microns, or other suitable size. Configurations in which a single ridge has a width of at least 2 microns, at least 3 microns, at least 5 microns, at least 7 microns, less than 10 microns, less than 100 microns, or other suitable size may also be used.

Figure 10:
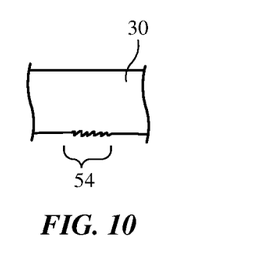

In the example of FIG. 10, structure 54 is formed from a light-scattering texture on the surface of member 30. The texture may be formed from ridges, grooves, pits, and/or bumps with widths of less than 2 microns, 0.1-10 microns, and/or a set of one or more of these widths. The root-mean-square (RMS) surface roughness of the textured surface in structure 54 may be at least 0.1 microns, at least 0.2 microns, at least 0.3 microns, at least 0.5 microns, at least 0.8 microns, at least 1 micron, at least 1.5 microns, at least 2 microns, less than 2 microns, less than 3 microns, less than 5 microns, less than 0.8 microns, less than 0.6 microns, or other suitable value.

Figure 11:
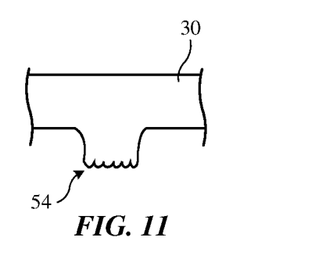

FIG. 11 is a cross-sectional view of member 30 in an illustrative configuration in which a larger protrusion has been provided with smaller surface features (e.g., texture or other protrusions). The larger protrusion of FIG. 11 may, as an example, have a width of at least 5 microns, at least 20 microns, at least 100 microns, at least 500 microns, less than 1000 microns, or other suitable width and a height that is 0.1-1000 times its width, at least 0.1 times its width, at least 1 times its width, at least 10 times its width, less than 12 times its width, less than 3 times its width or other suitable height. Smaller protrusions (e.g., parallel adjacent ridges and/or grooves, pits, bumps, etc. as shown in FIG. 9) and/or texture (see, e.g., the textured surface region of structure 54 of FIG. 10), and/or other structures may be incorporated a stray light blocking structure formed from a larger protrusion such as stray light blocking structure 54 of FIG. 11.

Figure 12:
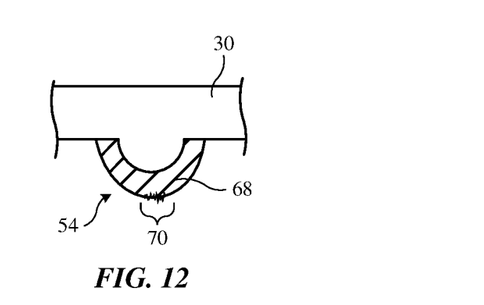

FIG. 12 is a cross-sectional side view of stray light blocking structure 54 in an illustrative configuration that includes a coating layer. Coating layer 68 may be placed onto a planar surface of member 30 (e.g., a planar inner surface of member 30) so that coating layer 68 covers a portion of member 30 that does not include protrusions and/or recesses and/or coating layer 68 may be formed on top of one or more surface features (protrusions and/or recesses). For example, coating layer 68 may be placed on a protrusion such as a bump or ridge on the inner surface of member 30. Coating layer 68 may be formed from polymer or other materials.

Light absorbing material (e.g., dye, pigment, or other material) may, if desired, be incorporated into the polymer of coating layer 68. The light absorbing material may be configured to absorb light at the wavelength of light that is emitted by device 52A (FIG. 4) and/or other wavelengths. For example, device 52A may emit near infrared light (e.g., light with a wavelength of 0.8-2.5 microns) or other infrared light and coating 68 may be configured to absorb near infrared light or other infrared light. Coating 68 may also absorb visible light. As shown in FIG. 12, coating 68 may be provided with surface structures such as texture and/or protrusions (e.g., protrusions and/or texture of the type described in connection with FIGS. 9, 10, and 11). Some or all of coating 68 may be patterned in this way and/or coating 68 may be free of surface texturing and/or other protrusions, recesses, etc.

Figure 13:
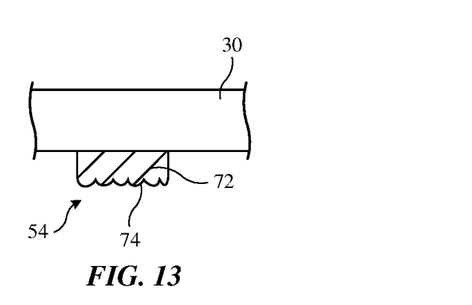

The example of FIG. 13 shows how stray light blocking structure 54 may be formed from a layer of material such as layer 72 that is attached to the surface of member 30 (e.g., a planar portion of member 30 and/or a portion with one or more protrusions and/or recesses). Layer 72 may be, for example, an index-matched polymer film. The film may be a sheet of polymer with adhesive for attaching to member 30 and/or layer 72 may be an adhesive layer. The index-matched polymer of layer 72 may have a refractive index that matches the refractive index of member 30 within 20%, within 5%, within 2%, or other suitable amount. Optional light-scattering structures 74 (e.g., texture and/or other pattered structures of the types described in connection with FIGS. 9, 10, and 11) may cover some or all of layer 72 and/or may be omitted from layer 72. Layer 72, which may sometimes be referred to as a coating, may include light-absorbing material of the type described in connection with coating 68 of FIG. 12.

If desired, stray light blocking structure 54 and/or member 30 may incorporate multiple types of material (e.g., multiple types of polymer with and/or without light-absorbing dye, pigment, etc.). As an example, member 30 may be formed from a clear or lightly tinted rigid polymer such as polycarbonate and structure 54 may be formed from a light-absorbing polymer (e.g., polycarbonate or other polymer with light-absorbing material such as dye and/or pigment that is configured to block stray light). Structure 54 may be attached to member 30 using heat and/or pressure and/or using adhesive bonding or other bonding techniques. If desired, structure 54 and member 30 may be formed during polymer molding operations (e.g., member 30 may be formed from a first shot of plastic and structure 54 may be formed from a second shot of plastic during a polymer injection molding process or other polymer molding process). Arrangements in which recesses or other features are molded into member 30 to serve as structure 54 may also be used. If desired, laser processing, mechanical machining operations, chemical etching, lamination, coating, molding, and/or other processes may be used in forming stray light blocking structure 54.

As described above, one aspect of the present technology is the gathering and use of information such as sensor information. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, interpupillary distance, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The foregoing is illustrative and various modifications can be made to the described embodiments. The foregoing embodiments may be implemented individually or in any combination.

What is claimed is:

1. An electronic device operable in an environment with an external object, comprising:
   a head-mountable support structure;
   a member comprising a layer supported by the head-mountable support structure that is configured to separate an exterior region that contains the external object from an interior region;
   a light-emitting component that is configured to emit light through the layer;
   a light-detecting component that is configured to detect the emitted light after the emitted light has reflected from the external object; and
   a stray light blocking structure formed as a protrusion on the layer that blocks stray light emitted by the light-emitting component that has been coupled into an interior portion of the layer and that is being guided within the interior portion of the layer towards the light-detecting component by total internal reflection, wherein the stray light blocking structure is interposed between the light-emitting component and the light-detecting component.

2. The electronic device defined in claim 1 wherein the layer is a polymer layer having an exterior surface facing the exterior region and an opposing interior surface facing the interior region, wherein the protrusion is on the interior surface, wherein the emitted light is infrared light, wherein the light-detecting component is configured to detect the infrared light, wherein the light-emitting component and the light-detecting component are configured to form a time-of-flight sensor, and wherein the stray light blocking structure is between the light-emitting component and the light-detecting component.

3. The electronic device defined in claim 1 wherein the protrusion is between the light-emitting component and the light-detecting component.

4. The electronic device defined in claim 3 wherein the member comprises polymer.

5. The electronic device defined in claim 3 wherein the protrusion includes a textured area.

6. The electronic device defined in claim 1 wherein the stray light blocking structure comprises multiple adjacent parallel ridges between the light-emitting component and the light-detecting component.

7. The electronic device defined in claim 1 wherein the stray light blocking structure comprises a polymer coating on the protrusion that is configured to absorb the stray light.

8. The electronic device defined in claim 1 wherein the stray light blocking structure comprises a polymer film on an interior surface of the layer that faces the interior.

9. The electronic device defined in claim 8 wherein the polymer film is configured to absorb the stray light.

10. The electronic device defined in claim 9 wherein the polymer film is between the light-emitting component and the light-detecting component.

11. The electronic device defined in claim 1 wherein the light-emitting component is in the interior region, wherein the light-detecting component is in the interior region, and wherein the emitted light has a wavelength of 0.8 to 2.5 microns.

12. The electronic device defined in claim 1 wherein the layer is a transparent layer that is configured to allow visible light to pass from the exterior region to eye boxes in the interior region.

13. The electronic device defined in claim 12 further comprising a display configured to provide images to the eye boxes that are overlaid on real-world content associated with the visible light passing from the exterior region to the eye boxes.

14. The electronic device defined in claim 1 further comprising a display that is coupled to the head-mountable support structure and that is configured to provide images to eye boxes in the interior region.

15. The electronic device defined in claim 1 wherein the light-emitting component and the light-detecting component are configured to form an optical sensor that measures distance between the external object and the optical sensor.

16. A head-mounted device, comprising:
   a head-mounted support structure;
   a transparent layer supported by the head-mounted support structure;
   an infrared light-emitting component configured to emit infrared light into the transparent layer at a first location; and
   an infrared light-detecting component configured to receive infrared light through the transparent layer at a second location, wherein the transparent layer has a first width at the first and second locations, wherein the transparent layer has a protrusion that blocks stray light from the infrared light-emitting component that is traveling within the transparent layer by total internal reflection towards the light-detecting component, wherein the protrusion is interposed between the infrared light-emitting component and the infrared light-detecting component, and wherein the transparent layer has a second width that is greater than the first width at the protrusion.

17. The head-mounted display defined in claim 16 further comprising a light-absorbing coating on the protrusion.

18. The head-mounted display defined in claim 16 wherein the protrusion has a width along a surface of the transparent layer of less than 10 microns and wherein the infrared light-emitting component and the infrared light-detecting component form a time-of-flight sensor.

19. A head-mounted device, comprising:
a head-mounted support structure;
a layer supported by the head-mounted support structure, wherein the layer has a planar outer surface and an opposing planar inner surface;
a first optical sensor on the layer having a first light-emitting device that emits light into the planar inner surface and a first light-detecting device; and
a second optical sensor on the layer having a second light-emitting device and a second light-detecting device; and
a stray light blocking structure on the planar inner surface that blocks stray light from the first light-emitting device that is traveling within the layer towards the second light-detecting device.

20. The head-mounted device defined in claim 19 further comprising a display configured to present an image, wherein the stray light blocking structure comprises a protrusion on the layer.

21. The head-mounted device defined in claim 20 wherein the protrusion comprises a ridge with a curved cross-sectional profile and wherein the ridge is between the first and second optical sensors.

* * * * *